(12) United States Patent
Ito et al.

(10) Patent No.: US 6,620,220 B2
(45) Date of Patent: Sep. 16, 2003

(54) NICKEL POWDER DISPERSION, METHOD OF PRODUCING NICKEL POWER DISPERSION AND METHOD OF PRODUCING CONDUCTIVE PASTE

(75) Inventors: Takayuki Ito, Kanagawa (JP); Hideo Takatori, Kanagawa (JP)

(73) Assignee: Toho Titanium Co., Ltd., Kanagawa (JP)

( * ) Notice: Subject to any disclaimer, the term of this patent is extended or adjusted under 35 U.S.C. 154(b) by 0 days.

(21) Appl. No.: 09/937,689

(22) PCT Filed: Jan. 26, 2001

(86) PCT No.: PCT/JP01/00541
§ 371 (c)(1),
(2), (4) Date: Sep. 28, 2001

(87) PCT Pub. No.: WO01/57885
PCT Pub. Date: Aug. 9, 2001

(65) Prior Publication Data
US 2002/0189402 A1 Dec. 19, 2002

(30) Foreign Application Priority Data
Jan. 31, 2000  (JP) ........................................ 2000-21897

(51) Int. Cl.[7] .............................. B22F 9/22; B22F 9/28
(52) U.S. Cl. ........................................... 75/362; 75/343
(58) Field of Search .................................. 75/362, 343

(56) References Cited

U.S. PATENT DOCUMENTS 5,262,466 A  * 11/1993  Baldi ......................... 524/430
5,929,139 A  *  7/1999  Mori et al. ................. 623/334

FOREIGN PATENT DOCUMENTS

| EP | 1025936 | 8/2000 |
| JP | 60-067603 | 4/1985 |
| JP | 03-034211 | 2/1991 |
| JP | 06-336601 | 12/1994 |
| JP | 08-246001 | 9/1996 |
| JP | 10-106352 | 4/1998 |
| JP | 10106352 A | * 4/1998 ........... H01B/01/22 |
| JP | 11-140514 | 5/1999 |
| JP | 2000-45002 | 2/2000 |

OTHER PUBLICATIONS

Japanese Patent Application Publication H08–246001, translation supplied by automated JPO system. Sep. 24, 1996.*
Japanese Patent Application Publication H10–106352, translation supplied by automated JPO system. Apr. 24, 1998.*

* cited by examiner

*Primary Examiner*—Roy King
*Assistant Examiner*—Andrew Wessman
(74) *Attorney, Agent, or Firm*—Drinker Biddle & Reath LLP

(57) ABSTRACT

A nickel powder dispersion prepared by adding an organic solvent to an aqueous nickel powder dispersion consisting of a ultrafine nickel powder having a mean particle diameter of no more than one micrometer and an aqueous solvent, in such a state that the organic solvent has replaced at least part of the aqueous solvent. The dispersion may further contain a surface active agent. The nickel powder dispersion possesses very good nickel powder dispersibility. When used in forming an electrically conductive paste, it shows excellent dispersibility in the paste dispersant. Multilayer ceramic capacitors fabricated using the paste are protected against shortcircuiting or delamination which can otherwise result from electrode surface irregularities.

8 Claims, 2 Drawing Sheets

NICKEL POWDER DISPERSION, METHOD OF PRODUCING NICKEL POWER DISPERSION AND METHOD OF PRODUCING CONDUCTIVE PASTE

FIELD OF THE INVENTION

This invention relates to an ultrafine nickel powder dispersion and, more particularly, to an ultrafine nickel powder dispersion for preparing an electrically conductive paste, for example, such a paste for forming internal electrodes of multilayer ceramic capacitors, to a process for preparing the ultrafine nickel powder dispersion, and also to a process for preparing a highly dispersible electrically conductive paste using the nickel powder dispersion.

PRIOR ART

Powders of precious metals such as silver, palladium, platinum, and gold, and also of base metals such as nickel, cobalt, iron, molybdenum, and tungsten have hitherto been used in forming electrically conductive paste as electronic material, especially as conductive paste for forming internal electrodes of multilayer ceramic capacitors. In general, a multilayer ceramic capacitor is made up of a plurality of dielectric ceramic layers and a plurality of metal layers that form internal electrodes laminated in an alternate arrangement, and two external electrodes formed at both ends of the two outermost dielectric ceramic layers for connection to the metal layers of the internal electrodes. The material to be used in forming the dielectric members is one consisting mainly of a material of high dielectric constant, such as barium titanate, strontium titanate, or yttrium titanate. For the metal to constitute the internal electrodes, powders of the above-mentioned precious and base metals have usually been used. More recently, weight has been placed on the base metal powders to meet the demand for less expensive electronic materials. In particular, the multilayer ceramic capacitors with electrodes of dielectric ceramic layers of nickel powder films are under active development.

The multilayer ceramic capacitors using electrodes of nickel powder coated films are commonly manufactured in the following way. First, dielectric powder of barium titanate or the like is mixed with an organic binder to form a suspension, and the suspension is spread to a sheet form by the doctor blade method to obtain dielectric green sheets. In the meantime nickel powder to form internal electrodes is mixed and dispersed with organic compounds such as organic solvent, plasticizer, and organic binder to form nickel powder paste. The paste is printed by screen printing onto the green sheets. The printed sheets are then dried, laminated, and compressed with other members, and the organic ingredients are removed by heat treatment. The multilayer structure is sintered at around or above 1300° C., and finally external electrodes are baked onto both outermost ends of the laminated dielectric ceramic layers, whereby a multilayer ceramic capacitor is obtained.

The multilayer ceramic capacitors are extensively used in cellular phones, personal computers, and other electronic articles. In recent years rapid progress has been made in the reduction of weight and size of the electronic components and in the improvement and expansion of their functions. To keep pace with the progress there has been growing demand for multilayer ceramic capacitors of smaller sizes and larger capacities. The trend calls for multilayer units of hundreds of layers each, with consequent reduction of the thickness of individual electrode layers and further lowering of resistance. Nowadays each electrode layer is as thin as from 1 to 2 $\mu$m, and even thinner layers will certainly be required in the future.

In the manufacture of multilayer ceramic capacitors, nickel powder is mixed with and dispersed in a paste-forming dispersant to form electrodes. At this stage, if coarse nickel particles are present or if the nickel particles during the course of mixing or dispersing aggregate to form secondary nickel particles larger in diameter than the thickness of each electrode layer that ranges from 1 to 2 $\mu$m, the resulting electrode layer surfaces will be uneven, with the consequence that the multi-layer ceramic capacitors thus obtained will be too susceptible to shortcircuiting for practical use. Moreover, in the stage of evaporating the organic ingredients from the nickel powder paste and in the subsequent stage of sintering, a volumetric change of the sintered product can take place because of the expansion or shrinkage of the metal powder. The dielectric material too can undergo a similar volumetric change as a result of the sintering. Thus simultaneous sintering of the two different materials, dielectric and nickel powder, causes volumetric changes of the two materials with expansion and shrinkage at different temperatures during the course of sintering. These volumetric changes present a problem of the fracture of laminated mono-lithic structure called delamination, in the form of cracking or separation of the laminated films. The phenomenon of delamination occurs remarkably when there are coarse nickel particles or excessively aggregated nickel particles as noted above.

As means for solving the delamination problem, various methods have heretofore been proposed. For example, Japanese Patent Application Kokai (Public Disclosure) No. 8-246001 teaches that the possibility of delamination is decreased by the use, as the material for electrodes of multilayer ceramic capacitors, of the ultrafine nickel powder produced by the vapor phase hydrogen reduction of nickel chloride vapor and which has a mean particle diameter between 0.1 and 1.0 $\mu$m and a tap density that satisfies conditions represented by a specific formula.

Problems That the Invention is to Solve

The above-mentioned technique of the prior art is effective to some extent in preventing delamination. However, nickel powder is not always fully dispersible when it is mixed and dispersed with a paste-forming dispersant. The nickel particles tend to aggregate, with the result that the increased proportion of coarse particles renders it difficult to decrease the thickness of internal electrodes and makes the electrode surface uneven, leading to shortcircuiting. In extreme cases these factors can combine to cause delamination. Thus there is room for improvement in the dispersibility of nickel particles in a dispersant for forming an electrically conductive paste of nickel powder.

It may be considered possible to provide a nickel powder dispersion prepared by dispersing nickel powder in water beforehand instead of adding nickel powder directly to a paste-forming dispersant. In practice, however, the degree of dispersion of nickel powder at the time of forming a nickel powder paste is far from satisfactory.

It is therefore an object of the present invention to provide a nickel powder which, when used together with a paste-forming dispersant to form an electrically conductive paste, exhibits excellent dispersibility and, when used in a multilayer ceramic capacitor, permits the prevention of shortcircuiting and delamination due to unevenness of electrode surfaces.

It is another object of the invention to provide a process for preparing an electrically conductive paste in which nickel powder is thoroughly and highly dispersed.

Means of Solving the Problems

After our intensive search for ways of realizing the above objects of the invention, it has now been found that a dispersion obtained by adding an organic solvent to a aqueous dispersion of ultrafine nickel powder exhibits very high dispersibility of the nickel powder when it is added to an electrically conductive paste-forming dispersant, and is suitable for applications as conductive paste, especially as a conductive paste for multilayer ceramic capacitors. The present invention is predicated upon this discovery.

In brief, the invention provides a nickel powder dispersion comprising an aqueous nickel powder dispersion composed of superfine nickel powder having a mean particle diameter of no more than one micrometer and an aqueous solvent, and an organic solvent added to the aqueous dispersion in such form that said organic solvent replaces at least a part of the aqueous solvent. A surface active agent may further be added to the dispersion.

The invention also provides, in a preferred form, a process for preparing a nickel powder dispersion which comprises forming an ultrafine nickel powder with a mean particle diameter of no more than one micrometer by a vapor phase reaction which involves reaction by contacting between nickel chloride gas and a reducing gas, washing the resulting nickel powder with water, adding pure water, thereby forming an aqueous nickel dispersion having an aqueous solvent concentration of no less than one percent by weight, adding a surface active agent as needed, and thereafter adding an organic solvent with at least a partial replacement of the aqueous solvent, whereby a nickel powder dispersion having an organic solvent concentration between 5 and 200 percent by weight is produced.

The invention further provides a process for preparing an electrically conductive paste which comprises adding an organic dispersant for forming an electrically conductive paste to the above nickel powder dispersion, and thereafter mixing and kneading the components.

For the purposes of the invention the expression "highly dispersible" or "excellent dispersibility" is used to mean that an ultrafine nickel powder undergoes less aggregation of the particles into secondary particles than usual and, when its cumulative size distribution as suspended in a solvent is determined using a laser light scattering particle counter (manufactured by Coulter Co. under the trade designation "Coulter LS230"), the mean particle diameter (e.g., D50) and coarse particle diameter (e.g., D90) are smaller than usual.

EMBODIMENTS OF THE INVENTION

FIG. 1 is a flow sheet illustrating a typical process for preparing an aqueous dispersion of ultrafine nickel powder and an electrically conductive paste in conformity with the present invention.

1. Nickel Powder

The nickel powder to be used under the invention is an ultrafine powder with a mean particle diameter of no greater than one micrometer. There is no special limitation to the mean particle diameter below one micrometer, unless it has any adverse effect upon the resulting electrically conductive paste or multilayer ceramic capacitor. With the recent tendency toward lighter and smaller electronic products, multilayer ceramic capacitors as their components too are required to be smaller than heretofore. Accordingly, there is demand for nickel powder of smaller diameter for use in the internal electrodes of those capacitors. The smaller the mean particle diameter and the larger the specific surface area, the more often the nickel particles tend to cause troubles, such as the aggregation of particles during the course of preparing a conductive paste or manufacturing a multilayer ceramic capacitor and a relatively large volatile content that evaporates upon sintering.

The nickel powder for use in the present invention is an ultrafine powder with a mean particle diameter desirably in the range from 0.01 to 1 $\mu$m, more desirably in the range from 0.05 to 0.5 $\mu$m. Typical mean particle diameters are 0.2 $\mu$m and 0.4 $\mu$m.

The nickel powder desirably has a specific surface area in the range from 1 to 20 $m^2/g$ as determined by the BET adsorption method.

It is further desirable that the nickel powder has a spherical particle shape to enhance its dispersibility as well as sintering properties.

The nickel powder for the invention can be produced by any known method such as a vapor phase or liquid phase process. Above all, a vapor phase reduction process in which nickel chloride gas and a reducing gas are brought into contact to form a nickel powder or a spray thermal decomposition process in which a thermally decomposable nickel compound is thermally decomposed by spraying is particularly desirable because the particle size of the resulting nickel powder is easy to control and spherically shaped particles can be produced with good efficiency.

The vapor phase reduction process involves a reaction between vaporized nickel chloride and a reducing gas such as hydrogen. For this purpose solid nickel chloride may be heated to produce nickel chloride gas. In consideration of the energy efficiency as well as the prevention of oxidation or moisture absorption of nickel chloride, a more advantageous approach is a method of manufacturing a nickel powder which comprises continuous production of nickel chloride gas through contact of metallic nickel with chlorine gas, direct feeding of the nickel chloride gas to a reduction process, and continuous reduction of the nickel chloride gas through contact with a reducing gas.

In the process of manufacturing a nickel powder through a vapor phase reduction reaction, the contact between nickel chloride gas and a reducing gas instantly forms nickel atoms, and the collision and aggregation of the nickel atoms cause the formation and growth of ultrafine particles. The particle diameter of the resulting nickel powder is determined by the partial pressure, temperature, and other conditions of the nickel chloride gas in the course of reduction. In the aforedescribed process for producing a nickel powder, nickel chloride gas is generated in an amount corresponding to the supply of chlorine gas. Through control of the chlorine gas supply, therefore, the quantity of nickel chloride gas to be fed to the reduction process can be adjusted and thereby the particle diameter of the nickel powder thus obtained can be controlled. A metal chloride gas is generated by the reaction between chlorine gas and a metal and, unlike the case in which a metal chloride gas is produced by the evaporation on heating of a solid metal chloride, it consumes less carrier gas or not at all depending on the conditions for production. Hence the vapor phase reduction permits the cutdown of the manufacturing cost through the consumption of less carrier gas and less energy for heating use.

The partial pressure of nickel chloride gas during the course of reduction can be controlled by mixing an inert gas with the nickel chloride gas that has been generated by chlorination. The control of the chlorine gas supply or of the partial pressure of nickel chloride gas being supplied to the reduction process makes it possible to control the particle size of the nickel powder too. Thus the particle size of the nickel powder can be stabilized and fixed as desired.

The conditions for producing nickel powder by the vapor phase reduction method as described above are suitably set so as to attain a mean particle diameter of no greater than one micrometer. By way of example, the metallic nickel as the starting material desirably is in the form of granules, lumps, or plates, with a particle diameter between about 5 and about 20 mm. It is also desirable that the metallic nickel has a purity of approximately 99.5% or upwards. The metallic nickel is first allowed to react with chlorine gas to generate nickel chloride gas. The temperature for this purpose is above 800° C. to effect thorough reaction but is below 1453° C., the melting point of nickel. Considering the reaction velocity and the durability of the chlorination furnace, a desirable practical temperature ranges from 900° C. to 1100° C. This nickel chloride gas is then directly fed to the reduction process for reaction with a reducing gas such as hydrogen gas. Alternatively, a mixed gas, consisting of the nickel chloride gas and an inert gas such as nitrogen or argon added in an amount of from 1 to 30 mol % to the nickel chloride gas, may be introduced into the reduction process. It is also possible to supply chlorine gas together with, or independently of, the nickel chloride gas to the reduction process. The supply of chlorine gas to the reduction process makes it possible to adjust the partial pressure of the nickel chloride gas and control the particle size of the resulting nickel powder. While the temperature for the reduction reaction has only to be high enough for the conclusion of the reaction, it is desired to be below the melting point of nickel because it forms solid nickel powder that is easier to handle. From the economic viewpoint, a temperature range from 900° C. to 1100° C. is practically advantageous.

Once nickel powder is formed by the foregoing reduction reaction, it is then cooled. A desirable practice for this purpose is rapid cooling of the gas stream around 1000° C. after the reduction reaction down to about 400 to 800° C. by the introduction of nitrogen gas or other inert gas. This renders it possible to prevent the formation of secondary particles due to the aggregation of the primary particles of the resulting nickel powder and obtain a nickel powder of desired particle size. The nickel powder so obtained is separated and recovered using, for example, a bag filter.

For the manufacture of nickel powder by spray thermal decomposition, a thermally decomposable nickel compound is used as the starting material. To be more specific, the starting material is one or two or more of nickel compounds, such as nickel nitrates, sulfates, oxynitrates, oxysulfates, chlorides, ammonium complexes, phosphates, carboxylates, and alkoxy compounds. A solution containing such a nickel compound or compounds is sprayed to form minute liquid droplets. A solvent to be used for this purpose is water, alcohol, acetone, ether or the like. The spraying is performed using ultrasonic wave, double jet nozzle or the like. The nickel compound in the form of minute droplets is heated at elevated temperature for thermal decomposition to form a metallic nickel powder. The heating temperature is above the point at which the specific nickel compound used is thermally decomposed, preferably in the vicinity of the melting point of nickel.

2. Aqueous Nickel Powder Dispersion

Under the invention the nickel powder thus obtained is suspended in water to form, at first, an aqueous dispersion or the nickel powder dispersed in an aqueous solvent to an aqueous solvent concentration of 1 wt % or more, preferably between 5 and 300 wt %, more preferably between 10 and 100 wt % or more. Here the term "aqueous solvent concentration" is used to mean the percentage by weight of the aqueous solvent with respect to the weight of the nickel powder in the dispersion. This means that the aqueous nickel powder dispersion is a slurry-like mixture of 100 parts by weight nickel powder and at least 1 part by weight, preferably from 5 to 300 parts, more preferably from 10 to 100 parts by weight, water. It is advisable to wash the nickel powder with water before suspension in water to remove nickel chloride particles and other foreign matter and, where necessary, to remove coarse particles and adjust the particle size of the nickel powder using a wet classifier such as a hydrocyclone. The prior art methods of manufacturing nickel powder similarly form nickel powder and wash it with water likewise. To obtain a final nickel powder product, the nickel powder is separated and dried to a powder free from water. According to the present invention, by contrast, an aqueous dispersion of nickel powder is prepared in the manner described above, and then the nickel powder is not dried but the aqueous solvent concentration is adjusted to be not less than one percent by weight, whereby the final nickel powder dispersibility is enhanced. In brief, a desirable procedure for the preparation of an aqueous dispersion of nickel powder according to the invention comprises forming nickel powder, for example, by vapor phase reduction in which nickel chloride gas and a reducing gas such as hydrogen are brought into contact, washing the resulting powder with water, adding pure water to settle down the nickel powder, removing the supernatant fluid by decantation, and thereafter, without drying the nickel powder, preparing an aqueous dispersion of the powder with an aqueous solvent concentration of one percent by weight or more.

A desirable aspect of the invention is adding a surface active agent to the aqueous dispersion of nickel powder prepared as above. The addition of a surface active agent facilitates the replacement of the water solvent with an organic solvent as will be described later and eventually allows the resulting paste to exhibit outstanding paste properties. The surface active agent to be used is one or two or more agents selected from the group consisting of cationic, anionic, amphoteric, nonionic, fluorine, and reactive surface active agents.

To be more concrete, useful cationic surface active agents include primary to tertiary aliphatic amine salts, quaternary aliphatic ammonium salts, benzalkonium salts, benzethonium chlorides, pyridinium salts, and imidazolium salts.

Among anionic surface active agents are fatty acid soaps, N-acylamino acid or its salts, carboxylates such as polyoxyethylene alkylether carboxylates, sulfonates such as alkylbenzene sulfonates, alkylnaphthalene sulfonates, dialkylsulfosuccinic ester salts, dialkylsulfosuccinates, and alkylsulfoacetates, sulfated oil, sulfuric ester salts such as higher alcohol sulfuric ester salts, polyoxyethylene alkylether sulfates, polyoxyethylene alkylphenylether sulfates, and monoglysulfates, and phosphoric ester salts such as polyoxyethylene alkylether phosphates, polyoxyethylene phenylether phosphates, and alkylphosphates.

Amphoteric surface active agents include carboxybetaine type, aminated ribonate, imidazyliniumbetaine, lecithin, and alkylamine oxides.

Examples of nonionic surface active agents are ether type ones such as polyoxyethylene mono- or dialkylethers in which the alkyl group has 1 to 18 carbon atoms, polyoxyethylene binary alcohol ethers, polyoxyethylene alkylphenyl ethers, polyoxyethylene sterol ethers, and polyoxyethylene lanolin derivatives, ether esters such as polyoxyethylene glycerin fatty acid esters, polyoxyethylene castor oil, polyoxyethylene sorbitan fatty acid esters, polyoxyethylene sorbitol fatty acid esters, and polyoxyethylene fatty acid alkanolamide sulfates, ester type ones such as polyethylene glycol fatty acid esters, ethylene glycol fatty acid esters, fatty acid monoglycerides, polyglycerin fatty acid esters, sorbitan fatty acid esters, propylene glycol fatty acid esters, and sucrose fatty acid esters, and nitrogen-containing type ones such as fatty acid alkanolamides, polyoxyethylene fatty acid amides, and polyoxyethylene alkylamines.

Examples of fluorine surface active agents are fluoroalkyl-carboxylic acids, perfluoroalkylcarboxylic acids, and disodium n-perfluorooctanesulfonylglutamate.

Reactive surface active agents are, for example, polyoxyethylene allylglycidylnonylphenyl ether and polyoxyethylene propenylphenyl ether.

The above-mentioned surface active agents may be used either singly or as a combination of two or more. Of these agents, desirable are the nonionic surface active agents whose HLB (hydrophilic-lipophilic balance) values usually range from 3 to 20. Particularly desirable are the hydrophilic nonionic surface active agents with an HLB between 10 and 20. To be more specific, by far the more desirable are one or two or more agents selected from the group consisting of polyoxyethylene alkylphenyl ethers such as nonylphenol ether and their phosphates and mixtures, polyoxyethylene sorbitan fatty acid esters such as polyoxyethylene sorbitan monostearate, polyglycerin fatty acid esters such as polyglycerin monostearate, and sorbitan fatty acid esters such as sorbitan monostearate.

Particularly suitable surface active agents are polyoxyethylene alkylphenyl ethers, their phosphates, and their mixtures.

3. Nickel Powder Dispersion (With Organic Solvent Added)

Next, an organic solvent is added to an aqueous dispersion of nickel powder prepared in the foregoing way. Organic solvents useful for the invention are alcohols, phenols, ethers, acetones, $C_{5-18}$ aliphatic hydrocarbons, kerosene, light oil, toluene, xylene, and other aromatic hydrocarbons, silicone oil, etc. Of these, the organic solvents soluble to some extent in water are desirable, typically alcohols, ethers, and acetones. Examples are methanol, ethanol, propanol, butanol, hexanol, 2-ethylhexanol, 2-methyl-1-propanol, isobutanol, 2-(ethylamino)-ethanol, 2-ethyl-1-butanol, 3-ethyl-3-pentanol, 2-isopropoxy-ethanol, 2-ethoxyethanol, 2-propoxyethanol, 2-methoxyethanol, 2-methoxymethoxyethanol, 1-octadecanol, n-octanol, 2,3-epoxy-1-propanol, cyclohexanol, dimethylbutanol, dimethylpropanol, 2,6-dimethyl-4-heptanol, 2,4-dimethyl-3-pentanol, 1,3-dimethoxy-2-propanol, dimethoxypropanol, 1-decanol, 1-dodecanol, trimethyl-butanol, 3,5,5-trimethylhexanol, nonanol, phenylethanol, 2-methyl-2-propanol, t-butanol, methylpropanol, 1-methoxy-2-propanol, 1-ethoxy-2-propanol, 1-butoxy-2-propanol, hexadecanol, heptadecanol, t-pentylalcohol, methylcyclohexanol, 2-methyl-1-butanol, 3-methyl-1-butanol, 3-methyl-3-pentanol, 3-methoxy-butanol, 2-(2-butoxyethoxy)ethanol, anilinoethanol, aminoethanol, aminopropanol, aminobutanol, 2-(butylamino)ethanol, 2-(methylamino)ethanol, 2-amino-2-ethyl-1,3-propanediol, 2-amino-2-methyl-1,3-propanediol, diphenylethanediol, ethylene glycol, glycerin, 2-ethyl-1,3-hexanediol, 2-chloro-1,3-propanediol, cis-1,2-cyclohexanediol, cis-1,4-cyclohexanediol, 3,5-dimethyl-1-hexine-3-ol, terpineol, butanediol, butenol, butoxypropanediol, propanediol, hexanediol, hexylene glycol, pentanediol, α-terpineol, diethyl ether, acetone, polyoxyethylene glycol having polymerization degree of 2, polyoxypropylene glycol, and polyoxyethylene glycol monoester. The use of ethanol type alcohols is particularly preferred. These organic solvents may be used in a combination of two or more. For a desirable combination, for example, a plurality of different alcohols may be mixed or a water-soluble alcohol and a solvent insoluble in water, such as a saturated hydrocarbon solvent, may be combined. Even with an organic solvent that is not soluble in water, such as α-terpineol, the addition of a surface active agent to an aqueous dispersion or organic solvent, permits efficient replacement of water with the organic solvent to give a nickel powder dispersion of the invention.

The organic solvent is added to an aqueous dispersion of nickel powder to obtain a nickel powder dispersion according to this invention. Under the invention, the aqueous solvent may remain unremoved in the nickel powder dispersion but preferably, after the addition of the organic solvent, water is removed from the dispersion so that it may be replaced by the organic solvent to which the solvent is added. At this point the residual water content in the dispersion is no more than 10% by weight, preferably no more than 5% by weight, more preferably no more than 2% by weight, on the basis of the weight of nickel powder in the dispersion. Thus, the nickel powder dispersion according to the invention may take two alternate forms; one consisting of nickel powder and the organic solvent and the other consisting of nickel powder, the organic solvent, and water. As for the replacement procedure, one consists of adding an organic solvent and washing the nickel powder with the same organic solvent by repeating decantation or filtration several times. An alternative process consists of adding an organic solvent and then evaporating water by heating or under reduced pressure. The replacement of water with an organic solvent is advantageous in that, when preparing an electrically conductive paste, the dispersion is favorably compatible with an organic dispersant that is used in forming the conductive paste, enhancing the dispersibility of the nickel powder to prevent its aggregation.

The concentration of the organic solvent in a nickel powder dispersion according to the invention is not specially limited. Considering the ease of handling and shelf life of the electrically conductive paste to be prepared, it is desirable that the organic solvent concentration is between 5 and 200% by weight, more desirably between 10 and 100% by weight, most desirably between 20 and 60% by weight. By "organic solvent concentration" is meant the percentage by weight of the organic solvent on the basis of the weight of the nickel powder in a dispersion. This means that the nickel powder dispersion according to the invention is a slurry-like mixture of 100 parts by weight nickel powder and from 5 to 200 parts by weight, preferably from 10 to 100 parts, more preferably from 20 to 60 parts by weight, organic solvent.

The nickel powder dispersion of the invention may contain the same surface active agent as mentioned above. The procedure for the addition of the surface active agent is either adding it following the addition of the organic solvent or adding it in advance to the organic solvent to be used and then adding the mixture to an aqueous dispersion of the nickel powder. For this purpose it is desirable to add the surface active agent as diluted with, or dissolved in, the above-mentioned organic solvent such as alcohol or acetone. The amount of the organic solvent to be used in diluting the surface active agent is between 1 and 50 parts by weight, preferably between 10 and 40 parts by weight, per part by weight of the agent. The addition of a surface active agent is effective in that it promotes the replacement of an aqueous nickel powder dispersion with an organic solvent. Considering the functional efficiency of a surface active agent, it is advisable to add a surface active agent beforehand to an aqueous nickel powder dispersion, allow thorough dispersion of the agent on the particle surface, and then add an organic solvent for replacement. Also, when an aqueous nickel powder dispersion is prepared by water washing the nickel powder made by the vapor phase reduction or other afore-described method, the addition of a surface active agent is desirable for the eventual preparation of a highly dispersible nickel powder dispersion and electrically conductive paste.

While there is no special limitation to the proportion of the surface active agent, the agent is added in an amount large enough to form a monomolecular film of the agent on the particle surface of the nickel powder. The amount of the surface active agent to be used usually per kilogram of the nickel powder is between 0.0001 and 100 g, preferably between 0.1 and 50 g, more preferably between 0.5 and 25 g.

Concrete procedures for preparing a nickel powder dispersion according to the invention will now be described by way of example.

(1) Adding an organic solvent such as alcohol to an aqueous nickel powder dispersion, stirring the mixture, allowing the mixture to stand still, then separating water by decantation, and thereafter removing the residual water content by heating at 50 to 150° C. to obtain a nickel powder dispersion.

(2) Adding a surface active agent such as polyoxyethylene alkylphenyl ether to an aqueous nickel powder dispersion with stirring, and further adding an organic solvent such as α-terpineol with stirring. After standing, decanting the mixture to separate water, and heating the mixture at 50 to 150° C. to remove the residual water content and obtain a nickel powder dispersion.

(3) Adding a surface active agent such as polyoxyethylene alkylphenyl ether to an aqueous nickel powder dispersion with stirring, adding an organic solvent such as α-terpineol with stirring, and further adding a surface active agent containing the polyoxyethylene alkylphenyl ether with stirring. After standing, decanting the mixture to separate water, and heating the mixture at 50 to 150° C. to remove the residual water content and obtain a nickel powder dispersion.

(4) Adding a surface active agent such as polyoxyethylene alkylphenyl ether to an aqueous nickel powder dispersion with stirring, adding a surface active agent containing the polyoxyethylene alkylphenyl ether with stirring for dispersion, and further adding an organic solvent such as α-terpineol with stirring. After standing, decanting the mixture to separate water, and heating the mixture at 50 to 150° C. to remove the residual water content and obtain a nickel powder dispersion.

(5) Adding a surface active agent such as polyoxyethylene alkylphenyl ether to an aqueous nickel powder dispersion with stirring, adding a surface active agent containing the polyoxyethylene alkylphenyl ether diluted with an organic solvent such as acetone with stirring for dispersion, and further adding an organic solvent such as α-terpineol with stirring. After standing, decanting the mixture to separate waters and heating the mixture at 50 to 150° C. to remove the residual water content and obtain a nickel powder dispersion.

Of these procedures, (3) to (5) involve the addition of a surface active agent to a nickel powder dispersion. The surface active agent to be added desirably causes aggregation to some extent of the nickel powder in the form of ultrafine particles about 0.1 μm or smaller in diameter. This permits effective replacement with an organic solvent at a later stage of the process and makes it possible to prepare eventually a highly dispersible electrically conductive paste. Ordinarily, when the nickel dispersion is prepared, the supernatant fluid is removed by decantation but the particles finer than 0.1 μm across can scarcely be removed, thus reducing the yield of the eventually obtained nickel powder dispersion. In contrast to this, the preparation of the nickel powder dispersion with some prior aggregation by means of a surface active agent or the like in the manner described above will increase the yield.

As noted above, the nickel powder dispersion of the invention possesses very good dispersibility, and an electrically conductive paste formed using the dispersion exhibits outstanding dispersibility, and consequently a multilayer ceramic capacitor made using the paste is protected against shortcircuiting or delamination due to unevenness of electrode surfaces.

4. Preparation of an Electrically Conductive Paste

An electrically conductive paste according to the invention is prepared by employing the nickel powder dispersion and adding an organic dispersant to the dispersion and thereafter kneading the mixture.

To be more specific, the conductive paste is prepared by adding the nickel powder dispersion to an organic solvent such as terpineol or decyl alcohol and to an organic dispersant, for example, a cellulosic organic resin such as ethyl cellulose. A plasticizer such as phthalic ester may be added too.

The nickel powder dispersion of the invention obtained as Above, when used in an electrically conductive paste, exhibits excellent dispersibility and, when the paste in turn is used in fabricating a multilayer ceramic capacitor, it protects the capacitor against shortcircuiting and delamination. The nickel powder dispersion permits the preparation of an electrically conductive paste in which the nickel powder is highly and thoroughly dispersed.

WORKING EXAMPLES

The present invention will be described in further detail in connection with its concrete examples below.

The mean particle diameter and the particle size distribution of the particles dispersed in a dispersant were determined by the following methods.

Determination of the Mean Particle Diameter

Test nickel powder was photographed through an electron microscope, and the diameters of 200 metallic particles in the photo were measured and the mean value was computed. The particle diameter represented the diameter of the minimum circle surrounding each particle.

Determination of the Particle Size Distribution of the Powder Dispersed in a Paste-Forming Dispersant Using a laser light scattering particle counter ("Coulter LS230" manufactured by Coulter Co.), a proper amount of a nickel powder dispersion or dry nickel powder was suspended in α-terpineol and dispersed under the influence of supersonic waves for 3 minutes. The particle size of the metallic powder in the dispersion was determined at a sample refraction index of 1.8, and the particle size distribution at a volume statistical value was found. In the particle size distributions summarized in Table 1, D90, D50, and D10 show the particle sizes at cumulative sizes of 90%, 50%, and 10%, respectively.

EXAMPLE 1

Preparation of Nickel Powder

A process for preparing nickel powder by a metal powder manufacturing equipment illustrated in FIG. 1 will now be explained.

At a chlorination stage, a chlorination furnace 1 was charged with 15 kg of nickel powder M having a mean particle diameter of 5 mm as a starting material. At the same time, the temperature of the atmosphere inside the furnace was set to 1100° C. by heating means 10. Next, chlorine gas was supplied from a chlorine gas supply line 14 to the chlorination furnace 1 at a flow rate of 4 Nl/min, to chlorinate the metallic nickel and generate nickel chloride gas. This nickel chloride gas was mixed with nitrogen gas supplied from an inert gas supply line 15 in the lower part of the chlorination furnace 1 at a rate of 10% (molar ratio) of the chlorine gas supply. It is advisable that a screen 16 be set up at the bottom of the chlorination furnace so that the material nickel powder M can be deposited on the screen 16.

In a reduction stage that followed, the nickel chloride-nitrogen mixture gas was fed through a nozzle 17 into a reduction furnace 2 heated by heating means 20 to an internal atmosphere temperature of 1000° C. at a flow rate of 2.3 m/sec (as at 1000° C.). Concurrently, hydrogen gas was supplied through a reducing gas supply line 21 connected to the top of the reduction furnace 2 to the furnace at a flow rate of 7 Nl/min to reduce the nickel chloride gas. As the reduction reaction between nickel chloride gas and hydrogen gas proceeded, a downwardly extending flame F like the flame of combustion of gaseous fuel such as LPG was formed under the lower end of the nozzle 17.

The reduction was followed by a cooling stage. The nickel powder P formed by the reduction reaction was cooled through contact with nitrogen gas supplied by a cooling gas supply line 22 connected to the lower part of the reduction furnace 2. The nickel powder P was separated and recovered.

Preparation of an Aqueous Dispersion of Nickel Powder

The recovered nickel powder P was then washed with water. Finally pure water was added and the nickel powder was allowed to settle down. The supernatant fluid was removed by decantation, and an aqueous dispersion of nickel powder was obtained. The water solvent concentration at this point was 60% by weight.

Preparation of an Organic Solvent Dispersion of Nickel Powder

To 2.5 kg of the aqueous dispersion of nickel powder (1 kg nickel powder and 1.5 kg water) was added 1 kg of 2-(2-n-butoxy-ethoxy)ethanol. The mixture was stirred at room temperature to disperse the nickel powder and was dried at 120° C. for 16 hours and then at 100° C. for 48 hours to obtain a nickel powder dispersion. The dispersion was practically free from residual water, the total water content having been replaced by the 2-(2-n-butoxyethoxy)ethanol.

The mean particle diameter of the nickel powder dispersion thus obtained was determined.

Preparation of an Electrically Conductive Paste

The nickel powder dispersion was further dispersed in α-terepineol, a dispersant for forming an electrically conductive paste. The particle size distribution was determined and the result was given in Table 1.

EXAMPLE 2

The aqueous nickel dispersion prepared in Example 1 was freed from coarse particles larger than 1.0 μm in diameter by a hydrocyclone and was washed, and pure water was added to the dispersion. Further, a mixture of 80% polyoxyethylene alkylphenyl ether phosphate and 20% polyoxyethylene alkylphenyl ether was added in an amount of 0.1% by weight on the basis of the weight of the nickel powder with stirring. The nickel powder was allowed to settle down, the supernatant fluid was removed by decantation, and an aqueous dispersion of the nickel powder was obtained. The water solvent concentration at this stage was 60% by weight.

The aqueous nickel powder dispersion was sampled in an amount of 2.5 kg (1 kg nickel powder and 1.5 kg water) and 1 kg of α-terpineol and 2.5 kg of a mixture of 80% polyoxyethylene alkylphenyl ether phosphate and 20% polyoxyethylene alkylphenyl ether were added to the dispersion. The mixture was dried at 120° C. for 16 hours and then at 100° C. for 48 hours to obtain an aqueous nickel powder dispersion. The dispersion was practically free from residual water, the total water content having been replaced by the α-terpineol.

The mean particle diameter and particle size distribution of the nickel powder dispersion thus obtained were determined, and the results are given in Table 1.

EXAMPLE 3

The aqueous nickel dispersion prepared in Example 1 was freed from coarse particles larger than 1.0 μm in diameter by a hydrocyclone and was washed, and pure water was added to the dispersion. Further, a mixture of 80% polyoxyethylene alkylphenyl ether phosphate and 20% polyoxyethylene alkylphenyl ether was added in an amount of 0.1% by weight on the basis of the weight of the nickel powder with stirring. The nickel powder was allowed to settle down, the supernatant fluid was removed by decantation, and an aqueous dispersion of the nickel powder was obtained. The water solvent concentration at this stage was 60% by weight.

2.5 kg of the aqueous nickel powder dispersion (1 kg nickel powder and 1.5 kg water) was sampled, and a mixture of 80% polyoxyethylene alkylphenyl ether phosphate and 20% polyoxyethylene alkylphenyl ether diluted with acetone was added to the dispersion in an amount of 2.5% by weight on the basis of the nickel powder. The mixture was stirred at 70° C. to disperse the nickel powder. Further, 1 kg of α-terpineol was added and stirred at room temperature. After removal of water by decantation, the mixture was dried at 120° C. for 16 hours and then at 100° C. for 48 hours to obtain an aqueous nickel powder dispersion. The dispersion was practically free from residual water, the total water content having been replaced by the α-terpineol.

The mean particle diameter and particle size distribution of the nickel powder dispersion thus obtained were determined, and the results are given in Table 1.

Comparative Example 1

The aqueous dispersion of nickel powder obtained in Example 1 was dried by heating without the addition of the organic solvent to obtain a nickel powder. The nickel powder freed from water was dispersed in the paste-forming dispersant in the same manner as described in Example 1, and the particle size distribution was determined and shown in Table 1.

Comparative Example 2

The aqueous dispersion of nickel powder obtained in Example 1 was used without the addition of the organic solvent and dispersed in the paste-forming dispersant in the same manner as in Example 1, and the particle size distribution was determined and shown in Table 1.

TABLE 1

|  | Example 1 | Example 2 | Example 3 | Comparative Example 1 | Comparative Example 2 |
| --- | --- | --- | --- | --- | --- |
| Mean particle diameter ($\mu$m) | 0.49 | 0.49 | 0.49 | 0.49 | 0.49 |
| Particle. size distribution ($\mu$m) | | | | | |
| D90 | 1.82 | 1.79 | 0.65 | 2.34 | 2.19 |
| D50 | 1.27 | 1.15 | 1.07 | 1.64 | 1.51 |
| D10 | 0.70 | 0.69 | 0.66 | 1.12 | 0.91 |

Testing the Surface Roughness of Nickel Electrode Layers

The nickel powder dispersions of Examples 1 to 3 and Comparative Example 2 and the nickel powder of Comparative Example 1 after the removal of water were applied on substrates, and the substrates were heated to evaporate the liquid to form electrodes, and their surface roughness values were determined. Table 2 shows the results. The conditions used in determining the surface roughness were as follows:

(1) Paste composition: α-terpineol . . . 42 wt % ethyl cellulose . . . 3 wt % nickel powder . . . 55 wt %
(2) Substrate: glass
(3) Paste coating means: screen printing
(4) Paste evaporating conditions: nitrogen gas atmosphere at 400° C.
(5) Surface roughness tester: electron three-dimensional roughness analyzer ("ERA-8000" manufactured by Elionics Co.)
(6) Method of determining surface roughness The area of a region surrounded by roughness curves drawn for individual scanning lines and the centerline was divided by the transverse length, i.e., the centerline mean roughness, was taken as the surface roughness of a field of vision, and the mean value of 10 such field samples was determined as the surface roughness of the paste. The lower the surface roughness the fewer the aggregates of nickel particles in the electrode layer, and hence the higher the degree of dispersion of nickel powder in the resulting electrically conductive paste.

TABLE 2

|  | Example 1 | Example 2 | Example 3 | Comparative Example 1 | Comparative Example 2 |
| --- | --- | --- | --- | --- | --- |
| Surface roughness ($\mu$m) | 0.080 | 0.065 | 0.052 | 0.249 | 0.0215 |

As can be seen from Table 1, the nickel powder dispersions in an organic solvent according to Examples of the invention showed the same mean particle diameter as observed under a scanning electron micrograph (SEM) as those of the nickel powder and aqueous nickel powder dispersion of Comparative Examples. Nevertheless, they differed in the particle size distribution of nickel powder as dispersed in a paste-forming dispersant. The nickel powders in the organic solvent dispersions of Examples were smaller in particle size than the powders of Comparative Examples throughout the ranges of D10–D50–D90. Their D90–D50 value of 0.55 indicated that the aggregation of the particles in the paste-forming dispersant had been kept low. Further, as shown in Table 2, experiments with these pastes in actually forming electrode layers revealed that the conductive pastes prepared from the nickel powder dispersions according to the examples of the invention gave electrode layers with low surface roughness values, limited aggregation of nickel particles used in conductive pastes, and very high dispersibility.

Effects of the Invention

As has been described, the nickel powder dispersion according to the present invention exhibits very good nickel powder dispersibility, and also, when it is formed into an electrically conductive paste, the powder shows excellent dispersibility in the conductive paste dispersion. Consequently, it can prevent the shortcircuiting and delamination due to unevenness of the electrode surfaces when the paste is used in fabricating multilayer ceramic capacitors.

Figure 1:
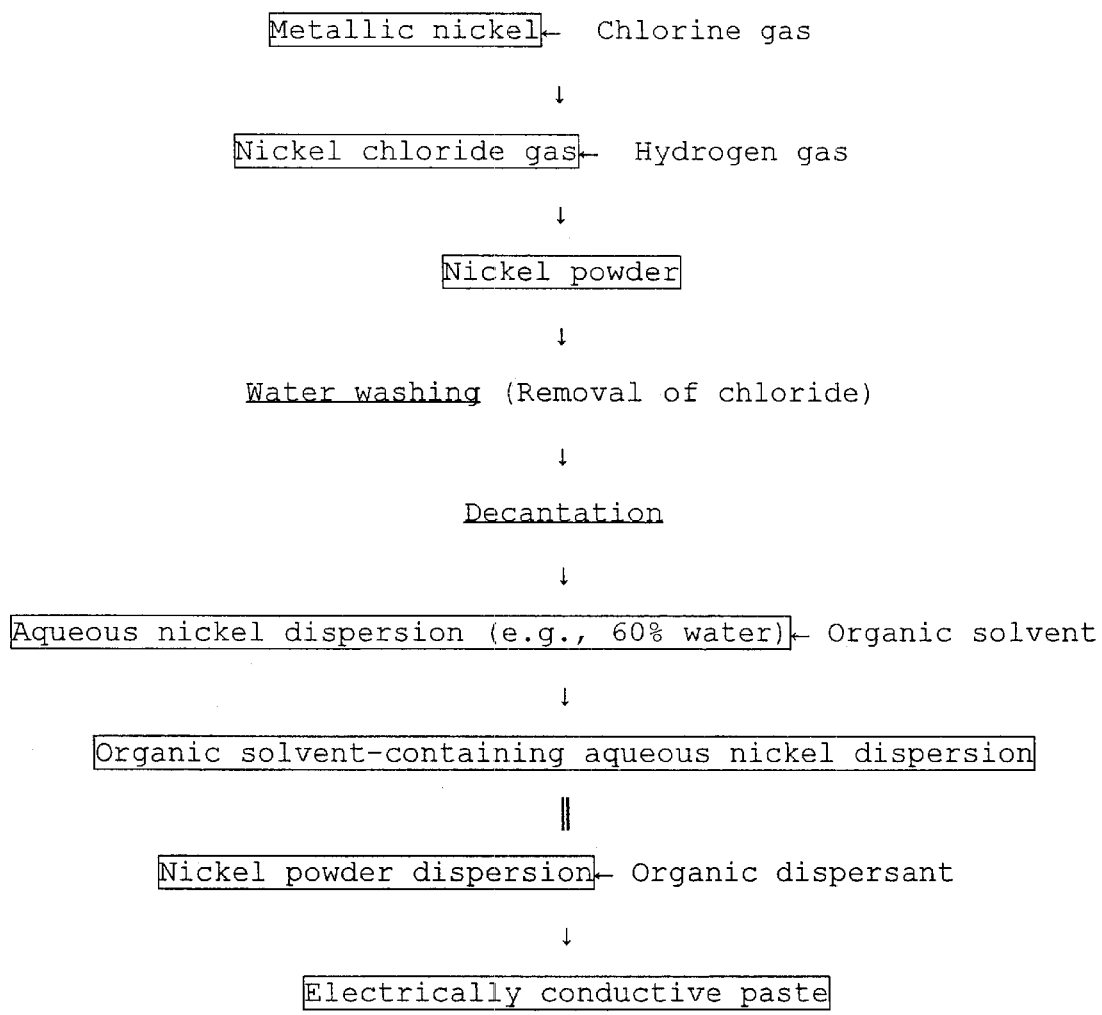
FIG. 1 is a flow sheet of the process for preparing an aqueous dispersion of ultrafine nickel powder and an electrically conductive paste using the same in accordance with the present invention.
Figure 2:
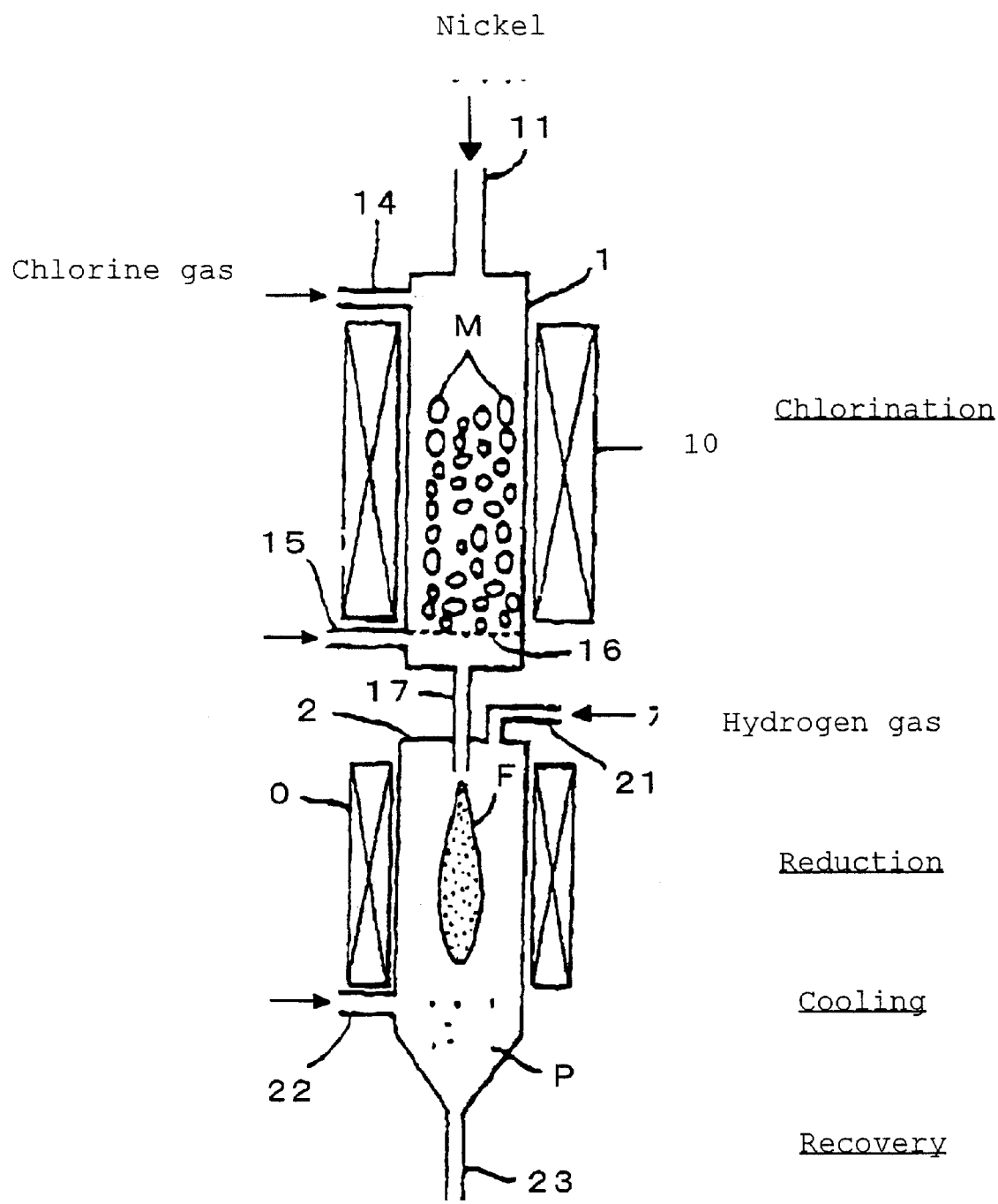
FIG. 2 is a vertically sectional view showing the construction of an equipment for manufacturing a metallic powder as used in the Examples of the invention.

What is claimed is:
1. A nickel powder dispersion comprising an aqueous nickel powder dispersion composed of ultrafine nickel powder having a mean particle diameter of no more than one micrometer, an aqueous solvent, a mixture of polyoxyethylene alkylphenyl ether and a phosphate thereof, and an organic solvent added to the aqueous dispersion in such form that said organic solvent replaces at least a part of the aqueous solvent.

2. The nickel powder dispersion of claim 1, in which the mean particle diameter of the nickel powder is between 0.01 and 1 μm.

3. The nickel powder dispersion of claim 1, in which the aqueous solvent concentration in the aqueous nickel powder dispersion is no less than one percent by weight.

4. The nickel powder dispersion of claim 1, in which the organic solvent concentration in the nickel powder dispersion is between 5 and 200 wt %.

5. The nickel powder dispersion of claim 1, in which the organic solvent is an alcohol.

6. The nickel powder dispersion of claim 1, in which the nickel powder is either a vapor phase reaction product obtained by reaction between nickel chloride gas and a reducing gas or a spray thermal decomposition product obtained by spraying and thermal decomposition of a thermally decomposable nickel compound.

7. An electrically conductive paste comprising the nickel powder dispersion of claim 1.

8. An internal electrode for a multilayer ceramic capacitor comprising the nickel powder dispersion of claim 1.

* * * * *